Nov. 3, 1959 J. L. HILTON 2,911,007
HYDRAULIC FLOW CONTROL VALVE DEVICES
Filed Dec. 2, 1957 2 Sheets-Sheet 2

John L. Hilton
by
William F. [signature]
his attorney.

United States Patent Office 2,911,007
Patented Nov. 3, 1959

2,911,007

HYDRAULIC FLOW CONTROL VALVE DEVICES

John Leslie Hilton, Hornchurch, England, assignor to The Plessey Company Limited, Ilford, Essex, England, a British company Application December 2, 1957, Serial No. 700,230

Claims priority, application Great Britain December 18, 1956

7 Claims. (Cl. 137—622.5)

This invention relates to hydraulic flow control devices and is particularly though not perhaps exclusively intended for the control of hydraulic fluid supply from a constant-displacement pump to a utilisation device actuated by pressure fluid such as a hydraulic ram cylinder and for the release of hydraulic liquid from said devices. It has previously been proposed to use for this purpose a control device which comprises a passage leading from the pump to the utilisation device actuated by the pressure fluid (such as a ram cylinder), a non-return valve in this passage to normally prevent flow in said passage in a direction from the utilisation device (ram cylinder), a by-pass port communicating with said passage, by-pass control means adapted to close said port, and manually operable control means having a normal or inoperative position in which said bypass port is open and said non-return valve is inoperative, a first operative position (ram-advance position) in which said by-pass port is closed while said non-return valve is operative, and a second operative position of the control device (ram-return position) in which said by-pass port is open and said non-return valve is lifted off its seat so as to be inoperative. Such control devices will hereinafter be referred to as flow control devices of the kind specified.

The present invention has for an object to provide improved control devices of the kind specified which are relatively simple in construction. Another object is to provide an improved valve device having multiple ports and means for simultaneously closing all said ports.

According to a preferred embodiment of the invention the check valve means comprise three ball valves arranged for co-operation with seats at the ends of three substantially radial bores constituting parallel ports connecting the passage leading from the pump to the non-return valve with the by-pass, and the actuating element is arranged to displace axially a cone-shaped cam which is allowed to centre itself on the three ball valves so as to ensure that when the actuating element is moved to its ram advance position, each of the three ball valves is fully closed. The conical operating surface of the cam may be arranged to surround the three ball valves and exert a closing force in an inward direction, or may be arranged to be surrounded by the three ball valves and exert a closing force in an outward direction.

Figure 1:
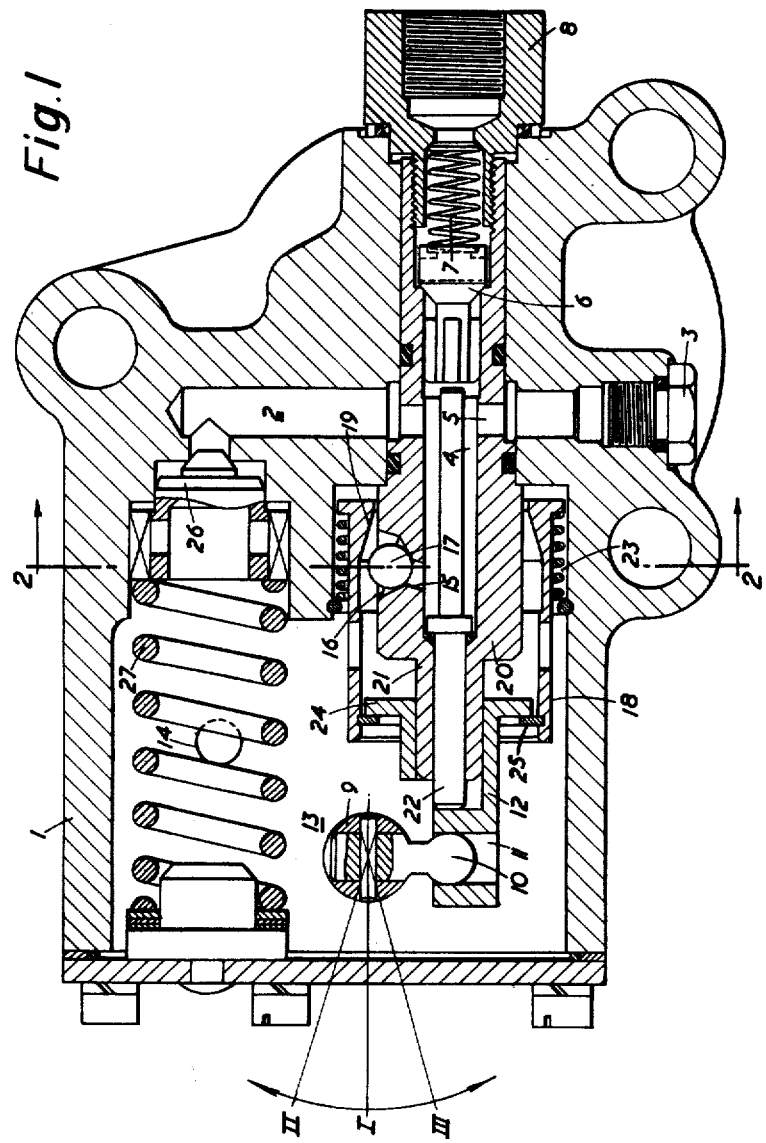
Figure 2:
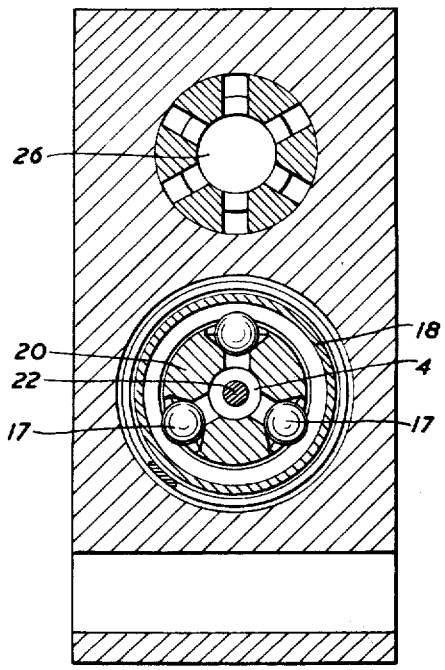

An embodiment of the invention is illustrated in the drawing accompanying the specification, in which Fig. 1 is a sectional elevation of a flow control device, and Figure 2 is a cross section on line 2—2 of Figure 1.

Referring now to the drawing, the flow control device comprises a housing 1 having an inlet chamber 2 in the form of a transverse bore adapted to be connected to a constant-displacement pump, for example by removal of a plug 3; a passage 4, formed in a valve body 20 communicates with the inlet chamber 2 by ports 5 and leads, past a non-return valve 6 loaded by a light spring 7, to a hollow connecting stud 8 adapted to be connected to the cylinder. The housing further contains a spill or by-pass chamber 13 communicating by a port 14 with the sump from which the hydraulic liquid is pumped. Three radial bores 15 are formed in the valve body 20, the bores 15 being uniformly spaced around the axis of the passage 4 so that only one of them is visible in the drawing, the bores 15 normally connecting passage 4 with the by-pass chamber 13. The outer end of each bore 15 is flared to form a seat 16 co-operating with a ball valve 17. A cam sleeve 18 surrounds the ball valves 17, the sleeve being normally in spaced relation thereto so as to prevent the valves from leaving the flared part 16 while not interfering with their normal opening and closing movement. The bore of the sleeve 18 has a conically constricted conical part 19 which, in the illustrated positon, is so arranged that the balls 17 are located at a position just beyond the larger end diameter of the cone-shaped portion.

The actuating element of the flow control device, comprises a shaft 9, shown in cross-section in Fig. 1, which is rotatably mounted in the housing 1. The shaft 9 which constitutes the manually actuated control element, is arranged, when rotated from the illustrated position 1 to either of positions 2 and 3, to displace a slide member 12 in the longitudinal direction of the passage 4 by means of a finger 10 engaging a slot 11 in the slide member. The sleeve 12 is guided on an extension 21 of the valve body 20 which contains the passage 4. A pin 22 is slidably mounted in the extension 21. When the slide member 12 is moved to the right (as seen in the drawing) from the illustrated position, the pin 22 will be pushed forward by the slide so as to force the non-return valve 6 off its seat. The cam sleeve 18, which may be held in its illustrated position by a light spring 23, is in a similar manner moved to the left by the action of a flange 24 of the slide member 12 when the latter is moved to the left as seen in the drawing.

Thus assuming first that the actuating element is in position 1, and therefore, the slide member 12 in the illustrated position, it will be understood that the liquid delivered by the pump into inlet chamber 2 will be free to escape to the by-pass chamber 13 through ports 5 and 15, lifting the ball valves 17 off their seats 16. No liquid will, therefore, reach the ram cylinder connected to stud 8, while on the other hand escape of liquid from the ram cylinder is prevented by the non-return valve 6. If the actuating element is now moved to position 2, which is the ram-advance position, the slide 12 is moved to the left, taking with it, by means of flange 24, the sleeve 18, and thereby forcing the cone-shaped portion 19 of the bore on to the valve 17, preventing the latter from being lifted off their seats. It will be observed that due to the arrangement of the flange 24, which co-operates with a slotted retaining ring 25 in the cam sleeve 18, this sleeve is free to centre itself on the balls 17 so as to exert equal pressure on to each of the three valves, thus ensuring that in fact all three of the ports 15 are completely closed. When this is the case, liquid supplied by the pressure chamber 2 can no longer escape to the by-pass chamber 13 through passage 15, and pressure will, therefore, be built up in chamber 2 overcoming the pressure in stud 8 and lifting the non-return valve 6 off its seat, so that liquid will now flow to the ram cylinder or cylinders until the valve control element 9 is returned to its position 1 or the ram reaches the end of its stroke whereby further movement is prevented. In the latter case the result is a further increase of pressure in the chamber 2, and in order to prevent this pressure from rising unduly in these circumstances, a relief valve 26 loaded by a spring 27 is provided in a well known manner, which leads the excess liquid to by-pass chamber 13. When the valve-actuating element is now returned to position 1, the sleeve 18 returns to its normal position, allowing the valves 17 to open again passages 15, so that chamber 2 freely communicates with the exhaust chamber 13 and the pump is unloaded. The movement of the ram will, however, not be reversed, since escape of liquid from the ram (or rams) is prevented by the non-return valve 6. To allow the ram to return from its extended position, the actuating element 9 is moved to position 3, in which pin 22 forces the non-return valve 6 off its seat, thus allowing liquid to escape from the ram cylinder or cylinders through connection 8, passage 4, and ports 15 to the by-pass chamber.

What I claim is:

1. A flow-control device comprising a housing having an inlet, a working outlet, a spill outlet, and a main passage interconnecting said inlet and main outlet, a non-return valve in said passage normally preventing flow from said outlet to said inlet, the housing also having a spill passage leading to the spill outlet from a point of the main passage between the inlet and non-return valve, said spill passage including three spill ports connected in parallel to each other and each terminating in a valve seat, the three valve seats being disposed radially of a common axis and distributed substantially uniformly about this axis, three check valve elements respectively co-operating with said seats and a cam member having a cone surface approximately coaxial with said axis and movable longitudinally thereof for joint co-operation with said valve elements to apply said elements to their respective seats under equal seating pressure.

2. A flow control device as claimed in claim 1, wherein the three check valve elements are ball members of equal diameter.

3. A flow control valve device as claimed in claim 2 wherein the three valve seats are uniformly spaced about the extended axis of the non-return valve, the valve device further comprising a manually operable control member having two operative positions and an inoperative position, a thrust rod extending along the axis of the main passage from the manually operable control member to the non-return valve and operatively connected to said member and valve to hold said non-return valve open when and only when the control member is in one operative position, and means operatively interconnecting said control member and said cam member to hold the check valve elements on their seats when and only when the control member is in the other one of its operative positions.

4. A flow control device comprising a tubular member having an axial bore closed at one end and three radial bores uniformly distributed round the member in a common plane, each bore terminating in a valve seat at its outer end, three valve members co-operating respectively with the seats of the three bores to form check valves, and a cam sleeve having a cylindrical bore portion fitting with radial play over the valve members seated on the seats of said tubular member and a conically constricted bore portion coaxially joining the cylindrical bore portion, said cam sleeve being movable axially and free to carry out a limited amount of radial movement relative to said tubular member for self-centering co-operation of said cone portion with the valve members to force said valve members jointly and with equal force upon their respective seats.

5. A flow control device comprising a tubular member having an axial bore closed at one end and three radial bores uniformly distributed round the member in a common plane, each bore terminating in a valve seat at its outer end, three ball members co-operating respectively with the seats of the three bores to form check valves, and a cam sleeve having a cylindrical bore portion fitting with radial play over the ball members seated on the seats of said tubular member and a conically constricted bore portion coaxially joining the cylindrical bore portion, said cam sleeve being movable axially and free to carry out a limited amount of radial movement relative to said tubular member for self-centering co-operation of said cone portion with the ball members to force said ball members jointly and with equal force upon their respective seats.

6. A flow control valve as claimed in claim 5, wherein the conically constricted bore portion of the cam sleeve terminates in a guide aperture fitting with radial play over the tubular member, further including an actuating sleeve member fitting slidably on the tubular member and having a flange fitting with radial play in the cylindrical parts of the sleeve adjacent the free end of said cylindrical part.

7. A device as claimed in claim 6, including a stop in said cylindrical part limiting axial relative movement between the actuating sleeve member and the cam sleeve.

References Cited in the file of this patent

UNITED STATES PATENTS

| | | |
|---|---|---|
| 2,475,260 | Slomer | July 5, 1949 |
| 2,607,599 | Kanuch | Aug. 19, 1952 |
| 2,679,263 | Kiser et al. | May 25, 1954 |
| 2,781,781 | Hruska | Feb. 19, 1957 |